US008494486B2

(12) United States Patent
Roundtree

(10) Patent No.: US 8,494,486 B2
(45) Date of Patent: Jul. 23, 2013

(54) SYSTEM AND METHOD FOR SECURELY MANAGING DATA STORED ON MOBILE DEVICES, SUCH AS ENTERPRISE MOBILITY DATA

(75) Inventor: Brian Roundtree, Kirkland, WA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/404,763

(22) Filed: Feb. 24, 2012

(65) Prior Publication Data
US 2012/0149338 A1 Jun. 14, 2012

Related U.S. Application Data

(62) Division of application No. 12/031,680, filed on Feb. 14, 2008, now Pat. No. 8,126,506.

(60) Provisional application No. 60/889,917, filed on Feb. 14, 2007.

(51) Int. Cl.
*H04M 1/66* (2006.01)
*H04K 3/00* (2006.01)

(52) U.S. Cl.
USPC .......... 455/410; 455/412.1; 455/558

(58) Field of Classification Search
USPC ...................... 455/410, 412.1, 558
See application file for complete search history.

(56) References Cited

U.S. PATENT DOCUMENTS

| | | | |
|---|---|---|---|
| 5,404,580 A | 4/1995 | Simpson et al. | |
| 5,475,735 A | 12/1995 | Williams et al. | |
| 5,675,628 A | 10/1997 | Hokkanen | |
| 5,790,798 A | 8/1998 | Beckett, II et al. | |
| 5,845,211 A | 12/1998 | Roach, Jr. | |
| 6,031,467 A | 2/2000 | Hymel et al. | |
| 6,199,045 B1 | 3/2001 | Giniger et al. | |
| 6,219,047 B1 | 4/2001 | Bell | |
| 6,246,756 B1 | 6/2001 | Borland et al. | |
| 6,301,480 B1 | 10/2001 | Kennedy, III et al. | |
| 6,368,205 B1 | 4/2002 | Frank | |
| 6,370,399 B1 | 4/2002 | Phillips | |
| 6,389,278 B1 | 5/2002 | Singh | |
| 6,424,945 B1 | 7/2002 | Sorsa | |
| 6,430,407 B1 | 8/2002 | Turtiainen | |

(Continued)

FOREIGN PATENT DOCUMENTS

| | | |
|---|---|---|
| CA | 2454334 A1 | 2/2003 |
| CN | 2478292 | 2/2002 |

(Continued)

OTHER PUBLICATIONS

"OMA Device Management Example Server for Advanced Device Management," Nokia, Feb. 1, 2006.

(Continued)

*Primary Examiner* — Lee Nguyen
(74) *Attorney, Agent, or Firm* — Perkins Coie LLP

(57) ABSTRACT

A system and method for managing data stored on mobile devices is described. In some cases, the system stores data, such as data under enterprise mobility management, within a secured memory location of a SIM card. In some cases, the system may request validation credentials before providing access to data stored in secure locations. In some cases, the system may review an access policy and request validation based on instructions from the access policy.

12 Claims, 7 Drawing Sheets

U.S. PATENT DOCUMENTS

| | | | |
|---|---|---|---|
| 6,466,783 B2 | 10/2002 | Dahm et al. |
| 6,496,979 B1 | 12/2002 | Chen et al. |
| 6,501,962 B1 | 12/2002 | Green |
| 6,591,229 B1 | 7/2003 | Pattinson et al. |
| 6,615,038 B1 | 9/2003 | Moles et al. |
| 6,618,478 B1 | 9/2003 | Stuckman et al. |
| 6,646,570 B1 | 11/2003 | Yamada et al. |
| 6,654,594 B1 | 11/2003 | Hughes et al. |
| 6,668,169 B2 | 12/2003 | Burgan et al. |
| 6,766,017 B1 | 7/2004 | Yang |
| 6,792,280 B1 | 9/2004 | Hori et al. |
| 6,795,703 B2 | 9/2004 | Takae et al. |
| 6,909,910 B2 | 6/2005 | Pappalardo et al. |
| 6,922,721 B1 | 7/2005 | Minborg et al. |
| 6,940,844 B2 | 9/2005 | Purkayastha et al. |
| 6,944,447 B2 | 9/2005 | Portman et al. |
| 6,954,754 B2 | 10/2005 | Peng |
| 6,961,587 B1 | 11/2005 | Vilppula et al. |
| 6,970,698 B2 | 11/2005 | Majmundar et al. |
| 7,149,508 B2 | 12/2006 | Herle |
| 7,170,993 B2 | 1/2007 | Anderson et al. |
| 7,177,665 B2 | 2/2007 | Ishigaki |
| 7,182,250 B2 | 2/2007 | Kelly et al. |
| 7,194,257 B2 | 3/2007 | House et al. |
| 7,218,912 B2 | 5/2007 | Erskine et al. |
| 7,228,434 B2 | 6/2007 | Zisowski |
| 7,295,836 B2 | 11/2007 | Yach et al. |
| 7,353,016 B2 | 4/2008 | Roundtree et al. |
| 7,359,706 B2 | 4/2008 | Zhao |
| 7,421,411 B2 | 9/2008 | Kontio et al. |
| 7,539,484 B2 | 5/2009 | Roundtree |
| 7,558,965 B2 | 7/2009 | Wheeler et al. |
| 7,660,870 B2 | 2/2010 | Vandermeijden et al. |
| 7,676,221 B2 | 3/2010 | Roundtree et al. |
| 7,735,021 B2 | 6/2010 | Padawer et al. |
| 7,756,545 B2 | 7/2010 | Roundtree |
| 7,773,982 B2 | 8/2010 | Bishop et al. |
| 7,881,703 B2 | 2/2011 | Roundtree et al. |
| 7,907,122 B2 | 3/2011 | LaPointe et al. |
| 7,970,437 B2 | 6/2011 | Mansikkaniemi et al. |
| 8,060,918 B2 | 11/2011 | Itoi et al. |
| 8,126,506 B2 | 2/2012 | Roundtree |
| 2002/0112172 A1 | 8/2002 | Simmons |
| 2003/0039948 A1 | 2/2003 | Donahue |
| 2003/0112931 A1 | 6/2003 | Brown et al. |
| 2003/0191945 A1 | 10/2003 | Keech |
| 2004/0142720 A1 | 7/2004 | Smethers |
| 2004/0171375 A1 | 9/2004 | Chow-Toun |
| 2004/0172561 A1 | 9/2004 | Iga |
| 2004/0193444 A1 | 9/2004 | Hufford et al. |
| 2004/0249846 A1 | 12/2004 | Randall et al. |
| 2005/0071657 A1 | 3/2005 | Ryan |
| 2005/0181875 A1 | 8/2005 | Hoehne et al. |
| 2005/0266885 A1* | 12/2005 | Katayanagi ................... 455/558 |
| 2006/0053308 A1 | 3/2006 | Zimmerman |
| 2006/0121882 A1 | 6/2006 | Zhao et al. |
| 2006/0245391 A1 | 11/2006 | Vaidya et al. |
| 2007/0005967 A1 | 1/2007 | Mister et al. |
| 2008/0189550 A1 | 8/2008 | Roundtree |
| 2008/0256447 A1 | 10/2008 | Roundtree et al. |
| 2008/0280588 A1 | 11/2008 | Roundtree et al. |
| 2009/0121020 A1* | 5/2009 | Gallagher et al. ............ 235/438 |
| 2009/0124271 A1 | 5/2009 | Roundtree et al. |
| 2009/0254912 A1 | 10/2009 | Roundtree et al. |
| 2010/0056114 A1 | 3/2010 | Roundtree et al. |
| 2010/0087175 A1 | 4/2010 | Roundtree |
| 2010/0093396 A1 | 4/2010 | Roundtree |
| 2010/0112997 A1 | 5/2010 | Roundtree |
| 2010/0169443 A1 | 7/2010 | Roundtree et al. |
| 2010/0227588 A1 | 9/2010 | Bradley |
| 2012/0191785 A1* | 7/2012 | Vandeputte ................... 709/206 |

FOREIGN PATENT DOCUMENTS

| | | |
|---|---|---|
| CN | 1361995 A | 7/2002 |
| CN | 1611087 A | 4/2005 |
| EP | 1387241 A2 | 2/2004 |
| GB | 2340344 A | 2/2000 |
| GB | 2365711 A | 2/2002 |
| JP | 1084404 | 3/1989 |
| JP | 11259199 A | 9/1999 |
| JP | 2003067334 A | 3/2003 |
| JP | 2004021580 A | 1/2004 |
| WO | WO-9707641 | 2/1997 |
| WO | WO-0070888 A2 | 11/2000 |
| WO | WO-0186472 A1 | 11/2001 |
| WO | WO-2005081852 A2 | 9/2005 |
| WO | WO-2005083996 A1 | 9/2005 |
| WO | WO-2006034399 A2 | 3/2006 |
| WO | WO-2007002499 A2 | 1/2007 |
| WO | WO-2008042989 A2 | 4/2008 |
| WO | WO-2008101135 A1 | 8/2008 |

OTHER PUBLICATIONS

3rd Generation Partnership Project. "Specification of the SIM Application Toolkit for the Subscriber Identity Module—Mobile Equipment (SIM-ME) Interface (Release 1999)," 3GPP Organizational Partners, 2004, 143 pages.

Center for Customer Driven Quality at Purdue University, "It's the Solution, Stupid," 2004, 2 pages.

Gartner, "Contact Center Investment Strategy and Leading Edge Technologies", http://www.gartner.com/4_decision_tools/measurements/measure_it_articles/2002_12/contact_center_investment_strategy.jsp, accessed on Jul. 8, 2008, 4 pages.

Muthukumaran et al., "Measuring Integrity on Mobile Phone Systems", Jun. 2008, pp. 155-164.

SNAPin Software Inc., "SNAPin White Paper. The Service Experience Opportunity," <http://www.snapin.com>, 2005, 16 pages.

* cited by examiner

SYSTEM AND METHOD FOR SECURELY MANAGING DATA STORED ON MOBILE DEVICES, SUCH AS ENTERPRISE MOBILITY DATA

CROSS-REFERENCE TO RELATED APPLICATION(S)

This application is a divisional of U.S. patent application Ser. No. 12/031,680 filed Feb. 14, 2008 now U.S. Pat. No. 8,126,506, entitled SYSTEM AND METHOD FOR SECURELY MANAGING DATA STORED ON MOBILE DEVICES, SUCH AS ENTERPRISE MOBILITY DATA, which claims priority to U.S. Provisional Patent Application No. 60/889,917, filed on Feb. 14, 2007, entitled ENTERPRISE MOBILITY MANAGEMENT, SUCH AS MANAGEMENT OF DATA USING SIM CARDS, each of which is incorporated by reference in its entirety.

BACKGROUND

Enterprise mobility management (EMM) entails managing mobile device technology provisioned by employers to their employees. Often, employers use EMM software installed mobile devices to manage the productivity of their employees, the security of provisioned devices, and/or the tracking of data with respect to compliance issues. For example, an employee's device may include tracking software that monitors data flows in and out of the device in order to prevent the loss or misuse of proprietary and confidential information that may be stored within the device.

However, as the processing capabilities and storage capacities of mobile devices increase, so do the risks involved in providing these increasingly powerful devices to users in unsecured environments. Many employees are using mobile devices to create, edit, store and otherwise access important, sensitive, or proprietary business information across many different applications (such as VPNs, email systems, sales programs, and so on) that have specific support and configuration requirements that may vary from one device to another. Because of the complexity of systems running on these devices and the variance between devices, current EMM systems may be unable to meet the tracking and security needs of these businesses.

For example, a sales representative may use several different applications running on his/her mobile device to generate proprietary and sensitive sales data for clients. If the sales representative were to misplace or lose the device, a competitor could gain access to some or all of the sensitive data.

Therefore, the need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Figure 1:
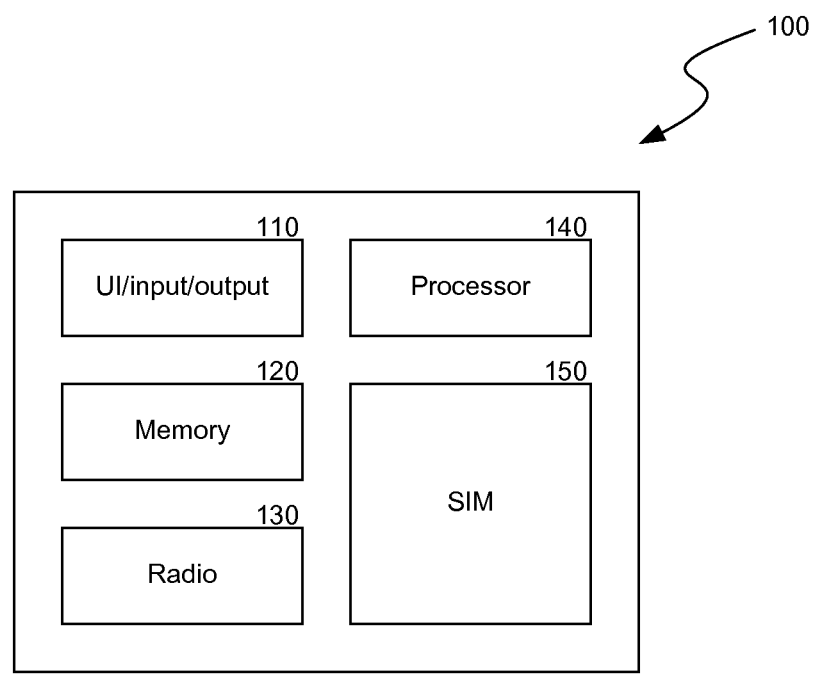
FIG. 1 is a block diagram illustrating components of a mobile device suitable to provide EMM security.

A method and system for securely managing and storing data on mobile devices, such as managing enterprise mobility data and applications using removable large-memory SIM cards or other smart cards, is described. In some examples, the system employs a scriptable management application stored within a SIM card of a mobile device to securely store and manage data, software applications, device configurations, application configurations, and so on. The management application may execute within the SIM card using a SIM based processor, and may be loaded onto a mobile device via the SIM card.

In some examples, the system can implement enterprise mobility management for mobile devices that do not contain such EMM capabilities. For example, insertion of a SIM card containing the system launches a management application that determines properties of the device and configures the device based on the properties and based on desired security settings.

The system may validate users requesting access to secure mobile device data and other assets via a configurable, dynamic access policy. For example, the system may assign different data under different levels of security, or may assign an access policy dependent on a determined location of the mobile device or on the timing of the user request for secured data.

In some examples, the system dynamically determines a level of security to be applied to storage locations for email and other information received by or sent from a mobile device. For example, a user may receive an email at his/her mobile device from a client and the system may automatically review characteristics of the email (such as metadata associated with the email, the content of the email, and so on), determine a security level for the email, and store the email in a storage location associated with the security level.

In addition to enterprise management, the system may provide the management services and capabilities discussed herein to wireless carriers, third party vendors, employers, businesses, and other entities that seek to provide, create, establish, and/or implement a secure storage and processing environment on a mobile device. For example, the system may be used by consumers to protect private or personal data (such as social security numbers, personal contacts, and so on). The system may facilitate users to perform secure consumer transactions on cell phones, such as secure online/mobile banking transactions, online bill pay, online purchases, and so on.

The system will now be described with respect to various embodiments. The following description provides specific details for a thorough understanding of, and enabling description for, these embodiments of the system. However, one skilled in the art will understand that the system may be practiced without these details. In other instances, well-known structures and functions have not been shown or described in detail to avoid unnecessarily obscuring the description of the embodiments of the system.

It is intended that the terminology used in the description presented below be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Suitable System

FIG. 1 illustrates a block diagram of a mobile device 100 on which SIM-based processes, such as mobility management and security applications, can be implemented. The mobile device 100 includes a user interface and other inputs and outputs (e.g., keypad, touch-based navigation components, microphone, speaker, visual display, and so on) 110, a memory 120, such as programmable non-volatile memory, and a radio component 130, such as a receiver/demodulator that receives a transmitted signal via an antenna and reconstructs the original transmitted signal and a transmitter/modulator that generates and transmits a signal. Furthermore, the mobile device 100 includes a processor 140, which may receive and send transmitted signals from the radio 130, may receive signals from the user interface and various inputs 110, may transmit signals to the user interface 110, and so on. In some cases, the mobile device may include a microcontroller (not shown) containing a decoder, a processor, RAM (Random Access Memory), digital signal processor, and so on. In addition, the mobile device 100 may include optional components, such as an automated data collection unit linked to the processor, which can include an automated RFID (Radio Frequency Identification) tag reader, a magnetic card swipe reader, a bar code reader, and others. Additionally, or alternatively, the mobile device may include a biometric reader (e.g., thumbprint reader, voice fingerprint recognition functionality, etc.), and/or a media output device (e.g., MP3 player, television tuner/player, etc.). Other hardware components can of course be included.

The mobile device also includes a subscriber identity module (SIM) 150, such as a SIM having a memory component and capable of storing scripts, applications, and other processes that assist the mobile device in providing enterprise mobility management, secure storage of assets, and other EMM services to users. The system may run and store scripts and other application within the SIM card 150, a Universal Integrated Circuit Card (UICC), or any removable secure microprocessor having associated memory. These and similar devices are interchangeable with respect to aspects of the technology, and the term "SIM" is simply used for convenience herein. In general, the system may store any and all components, modules, or data files required or used in providing services to users of the mobile devices.

The SIM 150 (or other removable memory card) and device may act as a "computer on a chip." They may contain a processor for executing scripts and files, a memory for storing scripts and files, and an operating system. Also called High Capacity SIMs, MegaSIMs, High Density (HD) SIMs, and SuperSIMs, they may have storage capabilities of 4 MB to 1 GB or more, and may enable 16 bit or 32 bit processors. The system described herein may be implemented in some or all of the SIMs listed above.

FIG. 1 and the discussion herein provide a brief, general description of a suitable telecommunications or computing environment in which the system can be implemented. Although not required, aspects of the system are described in the general context of computer-executable instructions, such as routines executed by a general-purpose computer, e.g., mobile device, a server computer, or personal computer.

Those skilled in the relevant art will appreciate that the system can be practiced with other communications, data processing, or computer system configurations, including: Internet appliances, hand-held devices (including personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

The mobile device 100 and/or SIM 150 may provide services that include executable software, software configurations, hardware configurations and controls, and handset operating system interfaces. As disclosed herein, executable software may include, without limitation, any software program stored on the mobile device or associated memory device, both permanently and temporarily connected via hardware or wireless connectivity. For example, the SIM 150 may include an authentication system, a mobile device interface, a report system, a script interface, a script platform, data, and scripts.

Figure 2:
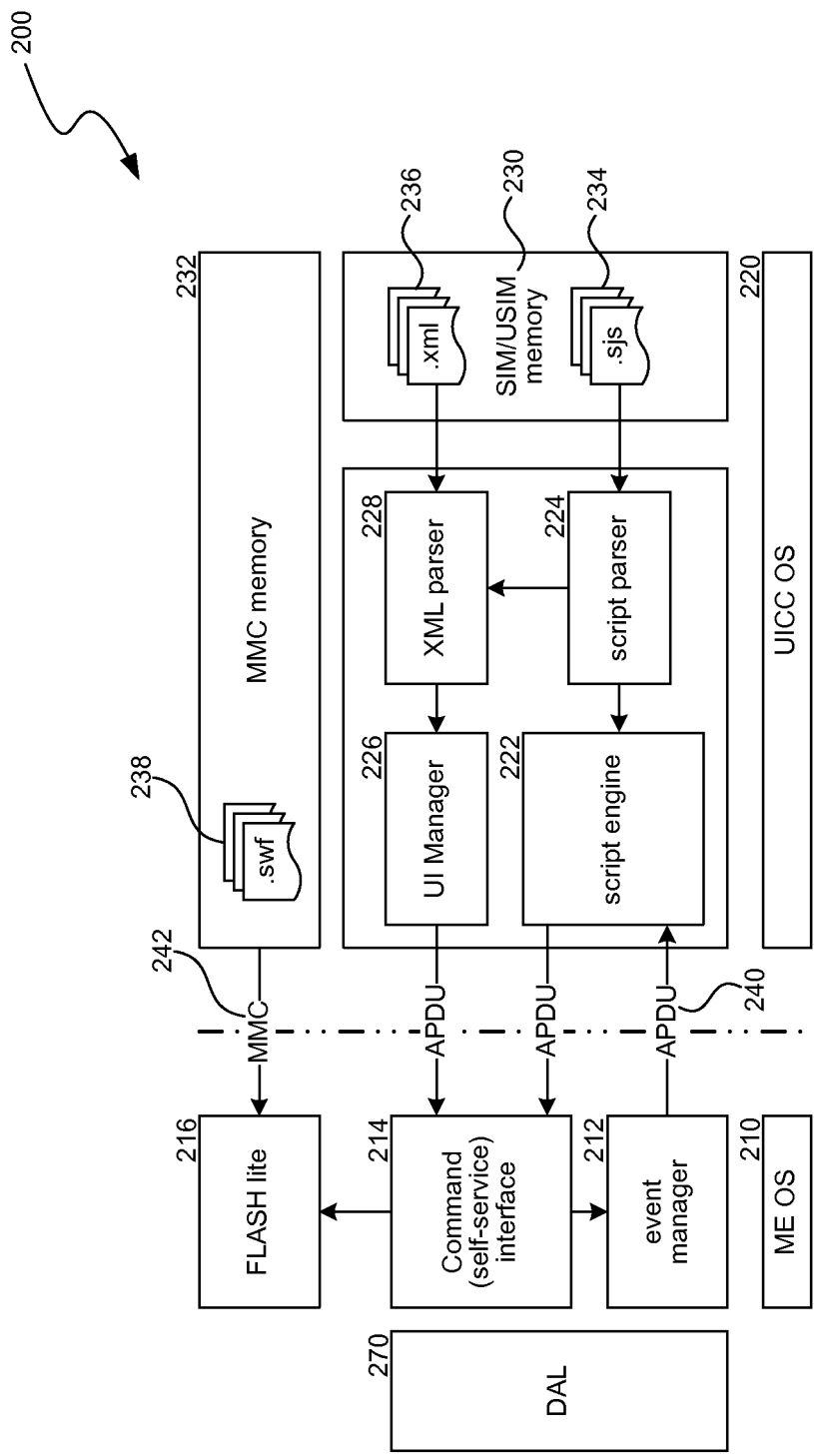
FIG. 2 is a block diagram illustrating a SIM-based EMM system.

Referring to FIG. 2, a block diagram illustrating an example architecture for a SIM-based system 200, where many components are stored and executed outside of a mobile device operating system 210, is shown. The mobile device's operating system (OS) 210 includes components such as an event manager 212 and a command interface 214 (such as a self-service interface). The system stores a script engine 222 for executing scripts, a script parser 224 for reviewing and determining what scripts to execute, a UI manager 226 for managing the user interface processes within the SIM, and an XML parser 228 within, and for execution by, an operating system 220 of a UICC, such as a SIM, integrated into or carried by a mobile device 200. The SIM OS 220 may contain some or all of these components (in some cases, these components may be components used by the system in performing the call intercept methods described herein). The SIM OS 220 may also contain a SIM/USIM memory 230 and a MMC memory 232. The system may use the memory 230 to store application files, data files, resources, and so on, such as .sjs (javascript specific) files 234 and .xml files 236. The system may use memory 232 to store multimedia application files, such as the .swf files 238 shown within the memory 232.

The event manager 212 calls preconfigured functions, such as "callback" functions when appropriate event triggers are encountered. Some examples of event triggers include, but are not limited to, a mobile device entering or returning from a power savings mode, a device data or power cable being connected or disconnected, the user pressing a specific button, specific buttons or a button sequence, the display being modified, the user initiating or receiving a phone call on the device, the device receiving or sending a message such as an SMS (Short Messaging Service), MMS (Multimedia Messaging Service), or IM (Instant Messaging) message, a portion of ME memory/storage 210 being modified, such as a database entry being created, changed, or removed (such as a new contact being added), a file matching a predetermined name and/or directory location being created, modified, or deleted, a network malfunction being encountered, and so on.

The self-service interface 214 enables a script engine 222 and/or a UI manager 226 located within a SIM OS 220 to issue run-time commands across a MESIM interface 240 to ME OS 210 components, such as the display engine 216 and the event manager 212. For example, the script engine 222 may call the self-service interface 214 to register a new callback function provided by a resource script file 234, in order for the callback function to be triggered when a specific event occurs, such as when the user requests a call be made to the cellular service provider's customer support center.

Additionally, the ME OS 210 or a combination of both the ME OS 210 and the SIM OS 220 may contain a client specific device abstraction layer 270 (DAL) that enables scripts to be installed to the device independent on the type of device or type of operating system employed by the device. The DAL functions by allowing applications to access data stored in persistent storage, such as data stored in the SIM 150. For example, the DAL may include a class of data access methods for the ME OS 210 which directly reference a set of procedures used to store data within the SIM 150. Thus, via the DAL, the ME OS 210 is able to access data from the SIM using simple techniques, such as via APIs.

For example, in order to facilitate calls between the self-service interface 214 and the UI manager 226 over the ME-SIM interface 240, the DAL may be located in both the self-service interface 214 and the UI manager 226. The DAL contains all operating system specific code in one place for such calls, which allows porting of a client to the device operating system to be simpler and faster (The alternative would be operating system code strewn throughout many files). The DAL includes an API. The system may implement the DAL API onto the operating system in order to run a client (such as the self-service interface 214) on the operating system, but does not need to perform any other changes to OS code. (A client may also need to be compiled into the machine language of the device, but there is no need for operating system specific calls, and thus does not require any code changes). Thus, in some examples of the system the DAL enables many functions typically performed between components within a device OS to be performed between the device OS and a SIM OS.

Components stored within the mobile device OS 210, such as the event manager 212, the self-service interface 214, and/or a display engine 216 (e.g., a FLASH lite engine, a hyper text browser, a music or video player, or other multimedia application) interact with the SIM OS 220 components to perform the processes and applications described herein. Examples of these processes and applications include call-intercept methods, diagnostic methods, configuration methods, presentation methods, display methods, and so on. They may interact or communicate via smart card or processor card channels such as APDU (Application Protocol Data Units) 240 (but may alternately use other external processor card communications channels such as SIM Toolkit APIs or alternative JavaCard APIs), or memory card channels such as multimedia card (MMC) channel 242, (but may alternately use other channels such as those suitable for USB, Compact-Flash, SmartMedia, MemoryStick, SecureDigital, and so on) for multimedia presentations sent from the SIM to the mobile device. The interaction between the mobile device and files and applications stored in a UICC, such as in the SIM card, will now be discussed.

Interactions Between a Mobile Device and a SIM

Figure 3:
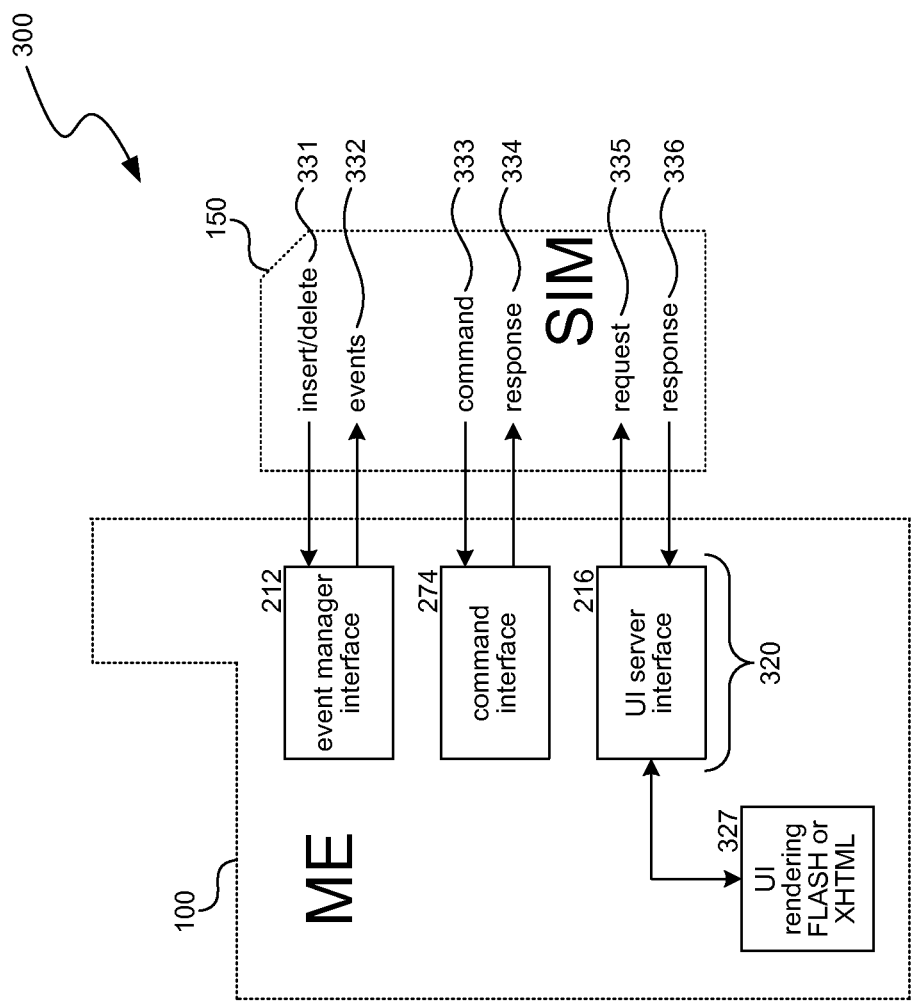
FIG. 3 is a block diagram illustrating data processes between a mobile device operating system and a SIM device containing an EMM system.

In some examples, the system enables storage of scripts, data and management applications within the memory of a SIM providing the mobile device OS the ability to send and receive many different commands to and from the SIM OS. The following table illustrates examples of commands used by the system:

Referring to FIG. 3, a block diagram 300 illustrating an example of data commands between a mobile device operating system and a removable memory device (such as a SIM) is shown. As shown in FIG. 2, the mobile device OS 210 of the mobile device 100 may contain interface components 320, such as an event manager interface 212, a command interface 214, and/or a UI interface 216 (which may communicate with a UI rendering engine 327, such as a FLASH or XHTML component), and so on. Some or all of the interface components 320 send and/or receive data from a removable storage and processing component, such as SIM card 150.

Scripts executing on the SIM card may insert and/or delete 331 callback functions, or other data structures to and/or from the mobile device OS 210. Additionally, upon an occurrence of an event at the mobile device (e.g., an indication of a trigger to validate the security of the device), the event manager interface 212 calls, exposes or publishes APIs (such as callback functions) 332 to the SIM 150 to alert the SIM of the event (such as data that indicates the trigger). In response, the SIM may expose APIs that act to instruct 333 the command interface 214 to execute a command and/or provide additional information. In turn, the command interface 214 may respond 334 to the commands 333. Additionally, the UI server interface 216 may send requests 335 for files, pages, or other content, to be presented for consumption by the UI rendering engine 327. The SIM may, upon approval, respond 336 to requests by transmitting files stored in the SIM 150 to the UI interfaces 326 and/or rendering component 327 for display to a user via the rendering component 327. Examples of other types of requests made from the UI interface 216 to the SIM 150 may be an indication that the user presents validation credentials via an entry user interface or via a selection from a menu of items.

As described herein, the system facilitates communications between the mobile device OS 310 and the SIM 150 via Application Programming Interfaces (APIs). For example, APIs in the OS related to an input event received by the mobile device (such as a key press) are exposed to the SIM 150 by the event manager interface 212 over the APDU channels (see event 332). Upon viewing the exposed API, a script engine on the SIM 150 may execute a script, and expose an API (such as a callback function) back to the mobile device OS 210 (see command 333). This may cause the UI server interface 216 to send a request via an API back to the SIM 150, such as an API that requests a specific page or display (see request 335). The SIM 150 may then respond by sending a static display over the APDU channel or a dynamic display over the MMC channel to the UI server interface 326 (see response 336) for presentation to a user via a user interface component, such as a display on the mobile device.

The storing of applications, engines, files, and so on within a SIM or UICC environment enables the system, in some cases, to optimize and/or simplify the memory and functionality of a mobile device and its required processes. Such architectures may minimize the porting required for full functionality of the device or may optimize mobile device code reuse by utilizing rendering systems already contained within the mobile device. Further, the system facilitates a more secure operating architecture, because the mobile device only performs consuming events authorized by a user or service provider due to the consumption occurring within the UICC. Security systems located in the SIM provide secure storage and/or pre-execution authentication. Because content related processes and scripts are contained in a secure SIM environment, the system may prevent hackers from taking over or controlling certain functions of a mobile device.

Enterprise Mobility Management

As described above, in some examples the system securely stores and/or manages data, software applications, device configurations, application configurations, and so on, with scriptable applications received from or executed by some or all of the SIM devices (and other UICC cards) described herein. For example, the system may store proprietary business data (such as business email data) within a secured memory component of a SIM card, and store other, non-proprietary data (such as user interface configuration settings) in other unsecured memory components of the SIM card.

Figure 4:
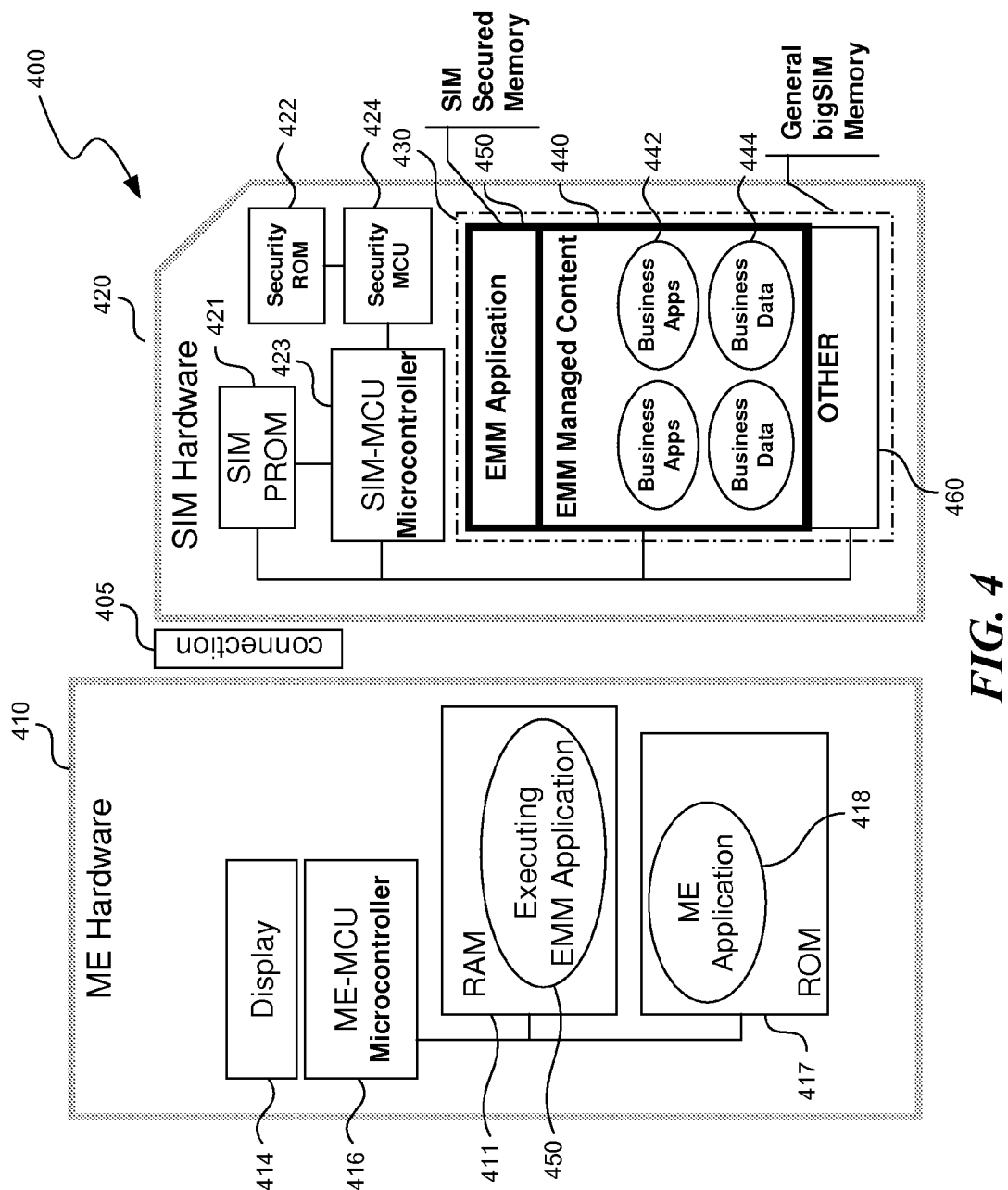
FIG. 4 is a block diagram illustrating example components of a mobile device with secured SIM memory.

Referring to FIG. 4, a block diagram 400 illustrating components of a mobile device including secured SIM memory is shown. The mobile device may contain hardware 410, such as a random access memory (RAM) component 411 that may execute an EMM application 450, a read only memory (ROM) component 417 that runs applications within the mobile device operating system 418, a display component 414, a microcontroller 416, and other components discussed herein.

The mobile device may be connected to and communicate with a memory component 420, such as a SIM card. The SIM card may include secure applications and components and non-secure applications and components (that is, applications and components that do not contain an additional level of security beyond the security afforded by the SIM card). The non-secure applications and components may include a programmable read only memory (PROM) 421, a SIM security ROM component 422, a SIM-based microcontroller 423, a security microcontroller 424, and so on. The SIM card may be any smart card having a processor and memory. The card may be tamper resistant and may use the card security features and schemes to secure the memory components.

The SIM card also contains memory 430, such as secured memory 440 and unsecured memory 460. The secured memory 440 may store data 444 and applications 2442 deemed to be proprietary or sensitive to outside users. That is, users of the mobile device 400 or the EMM system may select data 444 or applications 442 to store or execute from within the secured memory 440 of the SIM device 420 without compromising the data 444 or applications 442.

The secured memory 440 may also contain a management application 450 that may execute within the secure memory 440 of the SIM card 420 or may load from the SIM card 420 to the RAM 411 of the device to be executed by the device operating system. The management application 450 may cause EMM to be established on the mobile device 410, may update or create access policies, may update or create security levels, may initiate validation processes, may perform remapping of data to secure memory, and so on.

Figure 5:
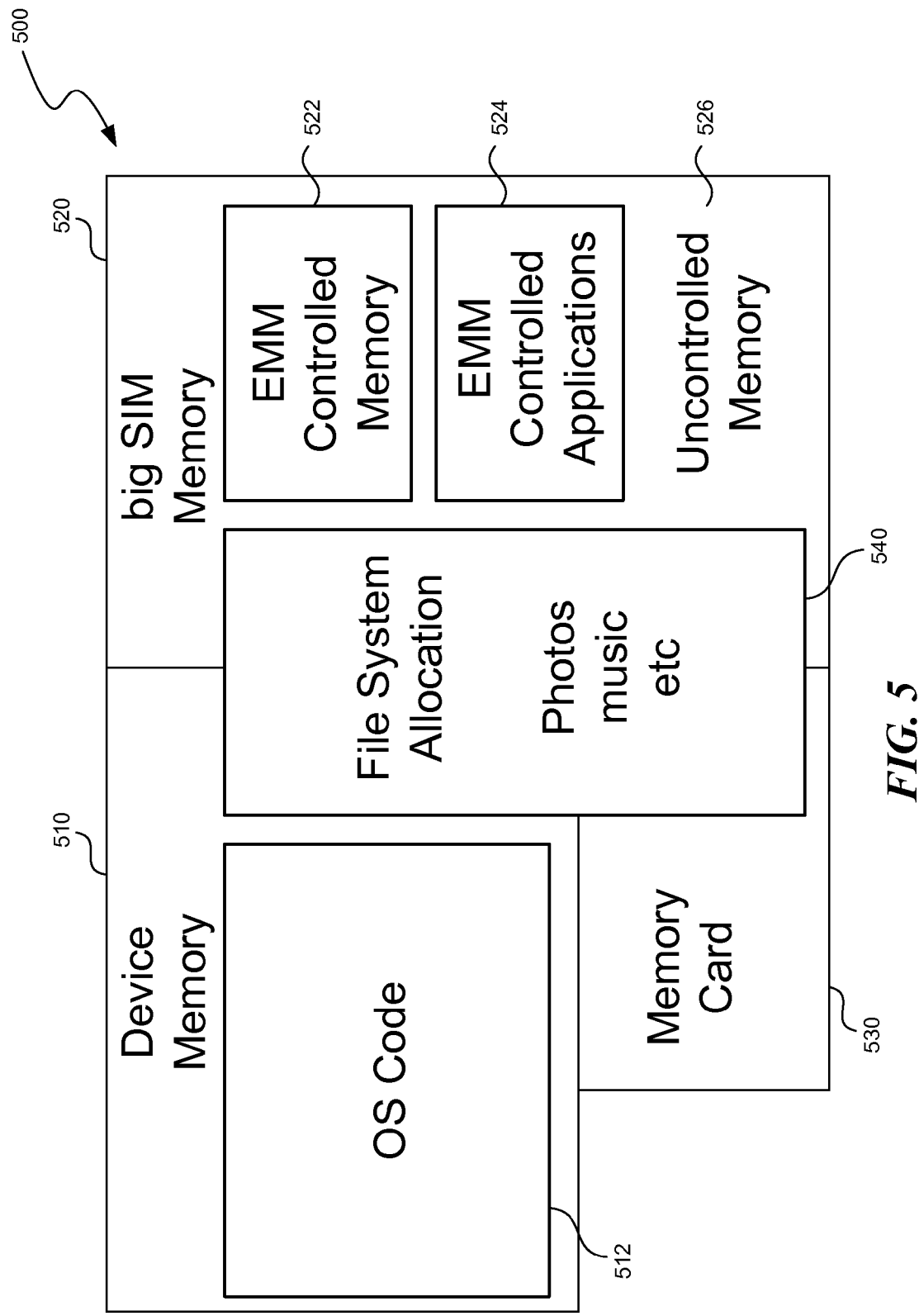
FIG. 5 is a block diagram illustrating memory architecture across a mobile device with secured SIM memory.

As described above, the system may determine a location to store certain data and other information based on an assigned security level of the data or other factors. The system can include the various levels of storage using memory of the device and memory of the SIM card. Referring to FIG. 5, a block diagram illustrating memory architecture 500 of a mobile device with secured SIM memory is shown. The memory architecture includes memory from different components of the device, such as the device memory 510, the SIM memory 520, and, optionally, a memory card 530 used to expand the storage capabilities of the device. The device may allocate portions of a file system 540 across some or all portions of the memory.

The device memory 510 may include a memory allotment for the device operating system 512, among other things. The SIM memory 520 may include a memory allotment for EMM controlled data and information 522 (such as secure memory 440 of FIG. 4), a memory allotment for EMM controlled applications 524 (such as the management application 450), and uncontrolled memory 526. Additionally, the SIM memory 520 may be further partitioned (not shown) in order to provide different levels of EMM security or to provide distinct locations for specific types of data or applications.

Determining the Security of a Mobile Device

As described above, the system can implement enterprise mobility management and other security management to mobile devices that do not contain such capabilities. For example, insertion of a SIM card containing the system launches a management application that determines properties of the device and configures the device based on the properties and based on desired security settings. Additionally, once established, the system can perform validation processes when required.

Figure 6:
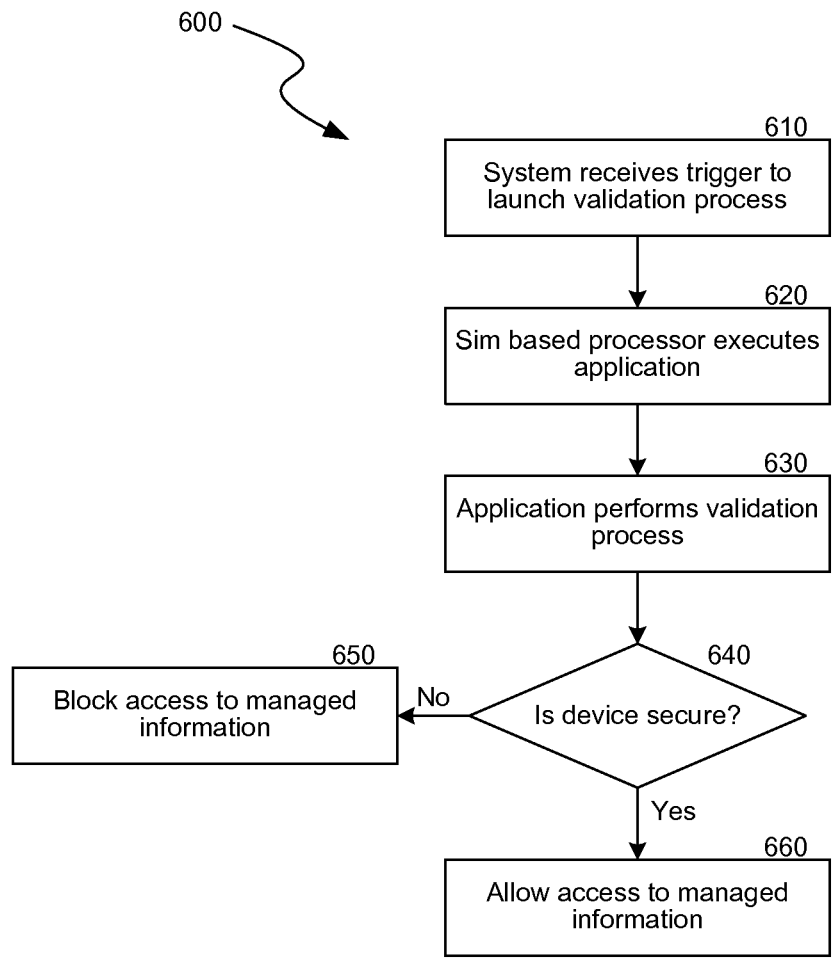
FIG. 6 is a flow diagram illustrating a routine for establishing EMM security for a mobile device.

Referring to FIG. 6, a flow diagram illustrating a routine 600 for establishing and determining the EMM security on a mobile device is shown. In block 610, the system receives an indication or trigger to launch a validation process. In some cases, the indication or trigger may be associated with insertion of a SIM card containing the system into an unused mobile device. In some cases, the indication or trigger may be associated with insertion of a SIM card containing the system into a previously used device that does not have EMM functionality. In some cases, the system may trigger the validation process when the device reboots or powers on and the device includes a SIM card containing the system.

In block 620, a management application stored in the SIM memory loads and executes on a processor stored in the SIM card. In some cases, the system may also detect, install, and/or execute the application on the device, such as within the RAM of the device. In some cases, upon execution, the system may detect previous installed EMM applications on the device and use the applications as configuration resources when establishing the EMM environment.

In block 630, the management application performs a validation process, such as those described herein. In some cases, the system may query a server in communication with the device to determine that the SIM card (and device) is secure (and not lost or stolen, for example). In some cases, a user may input a password to access data securely stored on the SIM card. For example, if the server is busy or otherwise not responsive, the system may request security credentials from the user. In some cases, the validation process may be determined by a dynamic access policy, described in further detail with respect to FIG. 7. The security validation may be in collaboration with security measures performed by the device or by the SIM card.

Additionally, the validation process may be re-triggered based on a variety of events, such as when the device wakes up from a "sleep" mode, when the availability of a network is changed, after a certain time period, when the mobile device requests to read, delete, or modify EMM managed data, and so on.

The system, in decision block 640, determines if the device is secure based on the validation process. If the validation process determines that the device is not secure, the system, in block 650, may deny or block access to data managed in a secure memory component within the SIM card. In some cases, the system may wipe, overwrite, or delete some or all managed data or other stored data. In some cases, the system may lock functionality and/or control of the device, such as user inputs, user interfaces, and so on.

If the validation process determines that the device is secure, the system, in block 660, allows access to the data managed in secure components. That is, the system enables a user to retrieve data stored in secured memory, such as data stored within memory 440 and memory 522.

Figure 7:
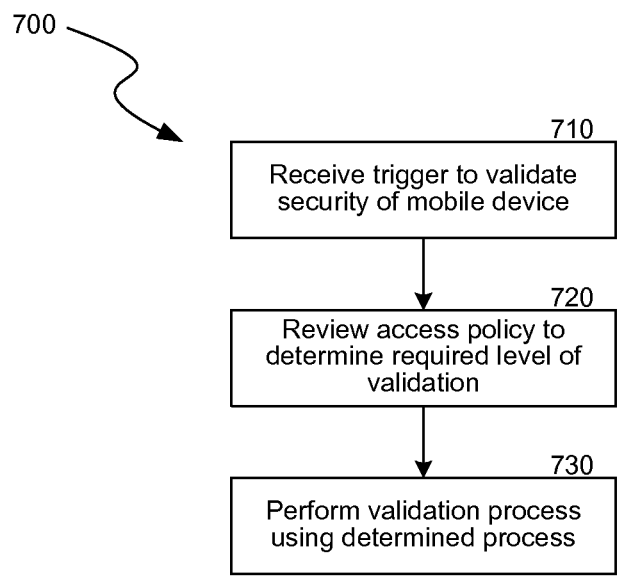
FIG. 7 is a flow diagram illustrating a routine for validating the security of a mobile device based on a dynamic access policy.

As described above, in some cases the system refers to an access policy before implementing a validation process. Referring to FIG. 7, a flow diagram illustrating a routine 700 for validating the security of a mobile device based on a dynamic access policy is shown. In block 710, the system receives a trigger to validate the security of the mobile device, such as one or more triggers discussed herein. For example, the system may determine the device has moved to a different location, such as by reviewing identification information associated with a cell tower in communication with the device, and trigger the system.

In block 720, the system reviews an access policy to determine a required level of validation, such as what validation process to perform. The access policy may be a dynamically changing policy that determines one or more characteristics, parameters, or locations of the mobile device and associates a validation process according to the determined characteristics, parameters, or locations. The access policy may define the validation process to be used, establish a time interval in which to require validation, and/or otherwise regulate access to secured data at a certain time for a certain device.

In some cases, the system uses the access policy to implement one or more validation processes based upon a review of location and network data associated with the device. The system may review cell tower IDs, mobile network codes (MNCs), mobile country codes (MCCs), signal strength, and other network and location information.

In some cases, the system uses the access policy to implement one or more validation processes based upon a review of the mobile device usage. The system may review patterns of usage related to applications, such as application under enterprise mobility management. For example, the system may determine that data (such as an email) is set for transmission to an unknown party and request validation credentials before such data is transmitted.

In some cases, the system uses the access policy to implement one or more validation processes based upon a time interval between a previous validation and a current use of secured data. For example, the system may determine that the time interval exceeds a threshold interval and require validations.

In block 730, the system validates the security of the device using the process determined in block 720. For example, the system may query a server to determine if the mobile device has been compromised, may request security credentials from a user of the device, and so on.

Use Scenarios

The following scenarios illustrate aspects of the system in use. Of course, the system may be used in other scenarios.

Scenario #1: Remapping of Email: A SIM card containing the system is inserted into a device that does not contain EMM software but has been used to receive, create, and send email messages. After insertion, the system modifies the device to remap storage of previously received and/or incoming email messages from a local directory (such as a directory within the memory of the device) to a secure directory (such as a directory within the secured memory of the SIM card). Thus, the system enables the device to store email messages within a secure memory location without requiring the device to provide such functionality.

Scenario #2: Working at the Office: A user sends a confidential message from his mobile device while at the office. The system queries the device to identify the location of the device, determines that the device is located within a secure environment (the office), and does not require the user to provide any credentials. The message is sent.

Scenario #3: Working Outside the Office: The same user sends a confidential message from his mobile device while at a client site. The system queries the device to identify the location of the device, does not recognize the location, and contacts a server to determine if the mobile device has been reported lost or stolen. The server reports back that the mobile device has not been reported lost or stolen. The message is sent.

Scenario #4: Attempting to Access a Lost Device: A lost mobile device is found by a competitor of a user of the device and the competitor attempts to access stored emails within the device. The system determines that the device has not been used for one hour, and looks to the access policy to identify a validation process to implement. The access policy instructs the system to request validation credentials. The competitor does not have the proper credentials, and is denied access.

Scenario #5: Determining Memory in which to Store Information: A user receives an email from a sender associated with his company. The system reviews metadata associated with the email, determines that the email may contain sensitive information, and stores the email within secured memory of the SIM card. The user receives a second email from a friend. The system reviews the metadata associated with the second email, does not recognize the email, and stores the email within the local, unsecured memory of the mobile device. Later, the user can retrieve the email from the unsecured memory without the need for validation.

Conclusion

As discussed herein, the system securely stores and manages data, software applications, device configuration, and application configurations using a scriptable management application that can be loaded from or directly executed by memory within a SIM card. To do so, the system may employ the SIM-based security to secure valuable business data and executable applications. In some cases, the system deploys and manages a mobile device's Man-Machine-Interface (MMI) using an on-device scriptable management application. Using the SIM card, the system may remotely deploy configuration and management services that can be autonomously executed on the device. Additionally, a generic mobile device can be automatically configured to a particular user and business policies, such as by using the management application to retrieve and employ employee/user/mobile-subscriber specific configurations and data for a device.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

While many embodiments described above employ software stored on the mobile device, the scripts and other applications noted above may be hard coded into the mobile device (e.g. stored in EEPROM, PROM, etc.). Further, the above functionality may be implemented without scripts or other special modules.

The teachings of the system provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the system can be modified, if necessary, to employ the systems, functions, and concepts of the various references described above to provide yet further embodiments of the system.

These and other changes can be made to the system in light of the above Detailed Description. While the above description details certain embodiments of the system and describes the best mode contemplated, no matter how detailed the above appears in text, the system can be practiced in many ways. Details of the local-based support system may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. For example, while only one aspect of the system is recited as embodied in a computer-readable medium, other aspects may likewise be embodied in a computer-readable medium. Accordingly, the inventors reserve the right to add additional claims after filing the application to pursue such additional claim forms for other aspects of the system.

I claim:

1. A method of providing security for email messages stored within a mobile device, the method comprising:
  receiving an indication that a removable storage device has been inserted into the mobile device,
    wherein the removable storage device includes a secure memory component and an unsecured memory component;
  loading from within the removable storage device a management application into the local memory of the mobile device; and
  executing the management application from the local memory of the mobile device,
    wherein the executed application causes email messages stored within the local memory to be mapped to the secure memory component of the removable storage device.

2. The method of claim 1, wherein the executed application causes email messages received by the mobile device to be mapped to the secure memory component of the removable storage device.

3. The method of claim 1, wherein the executed application causes a subset of the email messages stored within the local memory associated with enterprise mobility management to be mapped to the secure memory component of the removable storage device.

4. The method of claim 1, further comprising:
  receiving a request from a user to access an email message mapped to the secure memory component of the removable storage device;
  determining whether the request was received from an authorized user; and
  when the user is authorized, providing access to the requested email message, or
  when the user is not authorized, blocking access to the requested email message.

5. A computer-readable storage medium storing instructions that when executed by a mobile device implement security for email messages stored within a mobile device, the method comprising:
  receiving an indication that a removable storage device has been inserted into the mobile device, wherein the removable storage device includes a secure memory component and an unsecured memory component;

loading from within the removable storage device a management application into the local memory of the mobile device; and executing the management application from the local memory of the mobile device, wherein the executed application causes email messages stored within the local memory to be mapped to the secure memory component of the removable storage device.

6. The computer-readable storage medium of claim 5, wherein the executed application causes email messages received by the mobile device to be mapped to the secure memory component of the removable storage device.

7. The computer-readable storage medium of claim 5, wherein the executed application causes a subset of the email messages stored within the local memory associated with enterprise mobility management to be mapped to the secure memory component of the removable storage device.

8. The computer-readable storage medium of claim 5, further comprising:

receiving a request from a user to access an email message mapped to the secure memory component of the removable storage device;

determining whether the request was received from an authorized user; and when the user is authorized, providing access to the requested email message, or when the user is not authorized, blocking access to the requested email message.

9. A system of providing security for email messages stored within a mobile device, the method comprising:

means for receiving an indication that a removable storage device has been inserted into the mobile device, wherein the removable storage device includes a secure memory component and an unsecured memory component;

means for loading from within the removable storage device a management application into the local memory of the mobile device; and means for executing the management application from the local memory of the mobile device, wherein the executed application causes email messages stored within the local memory to be mapped to the secure memory component of the removable storage device.

10. The system of claim 9, wherein the executed application causes email messages received by the mobile device to be mapped to the secure memory component of the removable storage device.

11. The system of claim 9, wherein the executed application causes a subset of the email messages stored within the local memory associated with enterprise mobility management to be mapped to the secure memory component of the removable storage device.

12. The system of claim 9, further comprising:

means for receiving a request from a user to access an email message mapped to the secure memory component of the removable storage device;

means for determining whether the request was received from an authorized user;

means for providing access to the requested email message when the user is authorized; and means for blocking access to the requested email message when the user is not authorized.

* * * * *